United States Patent [19]
Wright

[11] Patent Number: 5,275,193
[45] Date of Patent: Jan. 4, 1994

[54] FUSIBLE LINK SHUTOFF VALVE ASSEMBLY

[76] Inventor: John J. Wright, 9 Hix Ave., Rye, N.Y. 10580

[21] Appl. No.: 851,059

[22] Filed: Mar. 13, 1992

[51] Int. Cl.⁵ .............................................. F16K 17/40
[52] U.S. Cl. ...................... 137/75; 251/214; 251/298
[58] Field of Search .................. 137/72, 75, 457, 599; 251/298, 214

[56] References Cited

U.S. PATENT DOCUMENTS

| | | | |
|---|---|---|---|
| 2,809,010 | 10/1957 | Ipsen et al. | 137/599.1 X |
| 2,841,360 | 7/1958 | Gustavsson et al. | 251/298 X |
| 3,378,021 | 4/1968 | Milo | 137/75 X |
| 3,521,659 | 7/1970 | Seger | 251/298 X |
| 3,625,474 | 12/1971 | Juede | 251/77 |

OTHER PUBLICATIONS

*Seals and Sealing Handbook,* R. H. Warring, Gulf Publishing Company, Houston, Texas (1981), pp. 93-99.

Primary Examiner—Martin P. Schwadron
Assistant Examiner—Kevin L. Lee

[57] ABSTRACT

A shutoff valve assembly which includes a valve body comprising a first and second flanged sections disposed on opposite sides of a main flow chamber; a disc seat disposed within the valve body a shutoff disc having a diameter substantially the same as the outer diameter of the disc seat; a disc shaft perpendicularly disposed within a sidewall of the valve body and mechanically affixed to the shutoff disc at a recessed portion of the inner surface of the valve body such that the disc does not restrict fluid flow, provide turbulence or cause a pressure drop while in the open position, the disc shaft having an inner end disposed within the valve body and an outer end disposed external of the valve body, the inner end being a terminal end and the outer end being sealed by means of a packing gland which prevents leakage of fluid from the shutoff valve; a positive spring actuator assembly comprising a lever attached to the disc shaft, a spring connected to the lever which is capable of rotating the disc shaft about its axis, and a fail safe fusible link connected to the lever means in such a manner that the disc is in an open position during normal operations and closed when the fusible link is severed due to increased external temperatures or mechanically released; and an external bypass valve capable of directing the fluid flow from one side of the disc to the opposite side when the disc is in the closed position.

7 Claims, 7 Drawing Sheets

FUSIBLE LINK SHUTOFF VALVE ASSEMBLY

The present invention generally relates to a shutoff valve assembly which generally includes a valve body, a shutoff disc, a disc seat, a disc shaft, a positive spring actuator assembly, and a bypass valve. This valve assembly is uniquely designed to shut off flow under emergency conditions, i.e., when external temperatures increase to undesirable levels, e.g., above 160° F., while providing an unobstructed fluid flow during normal operations, permit the bypassing of fluid flow during periodic maintenance or shutoff, and prevent fluid leakage through the disc shaft. These valve assemblies are particularly suited for fuel hydrant and air start pits and any other applications where a simple, reliable fusible link shutoff valve is required.

BACKGROUND OF THE INVENTION

In the design and construction of fuel hydrant pits it is highly desirable, and in most instances mandatory, that an emergency shutoff valve be disposed between the hydrant riser and the hydrant valve. Conventional fusible link valve assemblies include a valve body, a shutoff disc, a disc seat, a disc shaft, a positive spring actuator assembly, and a bypass valve.

One disadvantage of conventional valves is that their discs are sealably connected to the disc shaft by means of various o-rings disposed about the disc shaft on both sides of the disc mount. The o-rings would melt from the heat of a fire, and hence be destroyed, such that fluid would leak out from the disc shaft and feed the fire. Still another problem resides in the disc mount design itself which in conventional valves causes the shutoff disc to protrude into the fluid flow path while in the open position, thereby restricting fluid flow, creating turbulence and increasing the pressure drop between the hydrant riser and the hydrant valve.

It would be most desirable to design a fusible link shutoff valve which does not leak during normal operations, a valve which is capable of allowing the fluid flow to be bypassed externally when the valve is in the closed position, and a valve which provides unrestricted fluid flow, no turbulence and low pressure drop.

The present invention also provides many additional advantages which shall become apparent as described below.

SUMMARY OF THE INVENTION

A shutoff valve assembly which includes a valve body comprising a first flanged section, a second flanged section and a main flow chamber, the first and second flanged sections being disposed on opposite sides of the main flow chamber; a disc seat disposed within the valve body having an outer diameter which is greater than the internal diameter of the main flow chamber; a shutoff disc having a diameter substantially the same as the outer diameter of the disc seat is disposed within the valve body; a disc shaft perpendicularly disposed within a sidewall of the valve body and mechanically affixed to the shutoff disc at a recessed portion of the inner surface of the valve body such that the disc does not restrict fluid flow, provide turbulence or cause a pressure drop while in the open position, the disc shaft having an inner end disposed within the valve body and an outer end disposed external of the valve body, the inner end being a terminal end and the outer end being sealed by means of a packing gland which prevents leakage of fluid from the shutoff valve; a positive spring actuator assembly comprising a lever means attached to the disc shaft, a spring means connected to the lever means which is capable of rotating the disc shaft about its axis, and a fail safe fusible link connected to the lever means in such a manner that the disc is in an open position during normal operations and closed when the fusible link is either severed due to increased external temperatures or is mechanically released; and an external bypass valve capable of directing the fluid flow from one side of the disc to the opposite side when the disc is in the closed position, thereby to equalize pressure on both sides of the disc and, as a consequence, enable opening of the shut-off valve.

The packing gland includes a packing tube affixed to the valve body and concentrically disposed about the disc shaft; a packing material disposed between the interior surface of the packing tube and the exterior surface of the disc shaft; a packing ring concentrically disposed about the outer end of the disc shaft in such a manner that the packing material is securely disposed between the packing tube and the packing ring; and mechanical means for securely affixing the packing ring to the packing tube.

Other and further objects, advantages and features of the present invention will be understood by reference to the following specification in conjunction with the annexed drawings, wherein like parts have been given like numbers.

DESCRIPTION OF THE PREFERRED EMBODIMENTS

The present invention provides a unique shutoff valve assembly which typically incorporates a rugged 160° F. fusible link, or any other temperature rated link, positive spring action, and stainless steel bypass valve for ease of operation and testing, all elements being in a compact face-to-face design required for hydrant pit installations and other areas where space is limited. Its usage is not limited to hydrants and air start pits but has a broad usage in a number of applications and industries where a simple, reliable fusible link shutoff valve is required.

Figure 1:
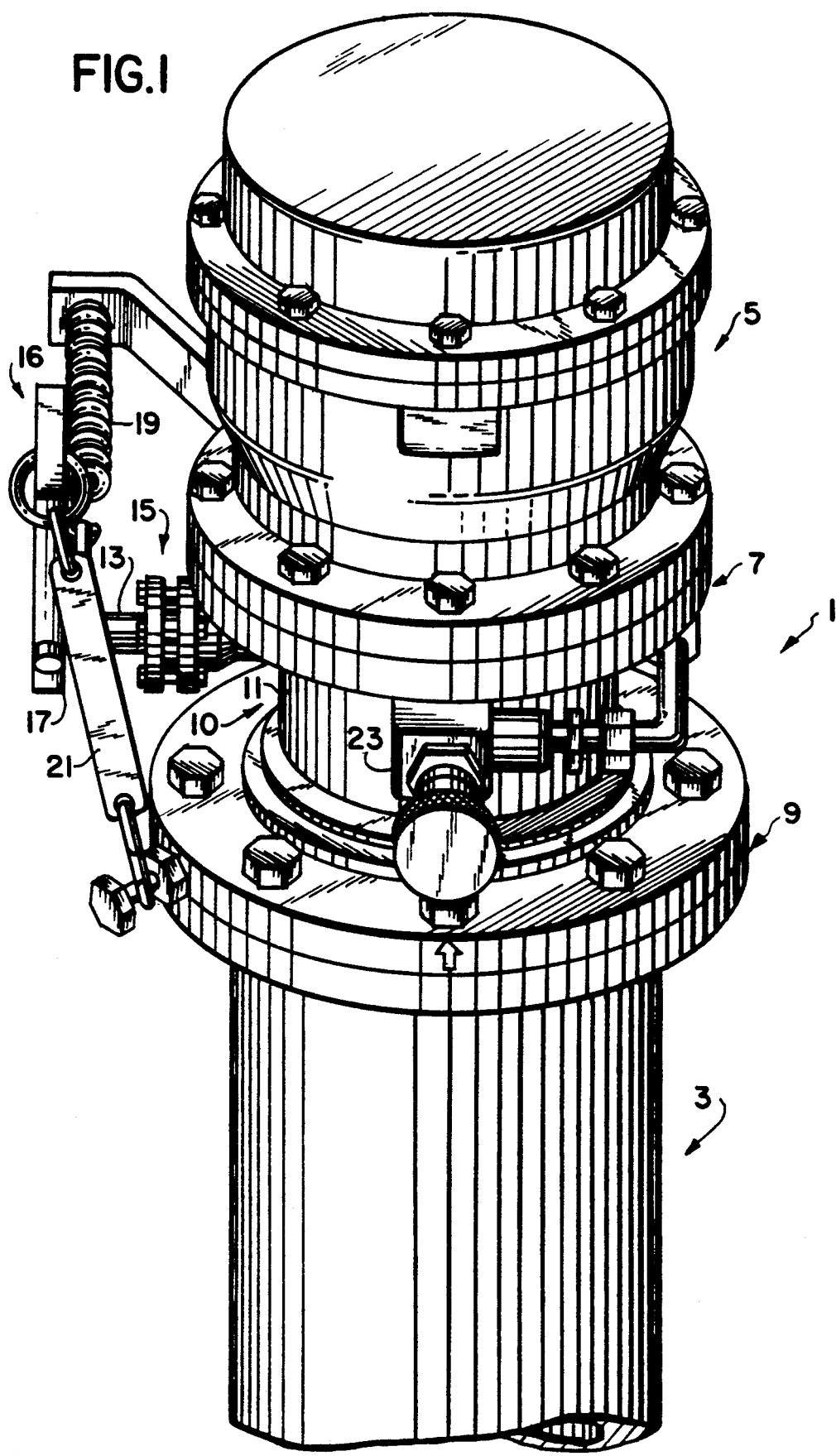
FIG. 1 is a top-front perspective view of a shutoff valve assembly disposed between a hydrant riser and a hydrant valve in accordance with the present invention.

This shutoff valve assembly can best be described by reference to the attached drawings wherein FIG. 1 shows a shutoff valve assembly 1 disposed between a hydrant riser 3 and a hydrant valve 5. Shutoff valve assembly 1 includes a valve body comprising a first flanged section 7, a second flanged section 9 and a hollow cylindrical section or member 10, which includes variable internal diameter portions, defining a main flow chamber 11. It will be seen that the first and second flanged sections are disposed on opposite sides of main flow chamber 11.

A disc shaft 13 is perpendicularly disposed within a sidewall of the valve body, the outer end of disc shaft 13 being sealed by means of a packing gland 15 which prevents leakage of fluid from the shutoff valve. A positive spring actuator assembly 16 comprises a lever means 17 attached to the disc shaft 13, a spring means 19 connected to lever means 17 which is capable of rotating disc shaft 13 about its axis, and a fail safe fusible link 21 connected to lever means 17 in such a manner that the disc (not shown) is in an open position during normal operations and closed when fusible link 21 is either severed due to increased external temperatures or mechanically released.

An external bypass valve 23, seen particularly in FIG. 1, is controlled by a control knob 23A, is superior in operation to conventional internal popet valves because it does not leak, whereas in popet valves, the high velocities involved cause "wire drawing" effects which produce leaking. The external bypass valve 23 is disposed above the exterior of shut-off valve assembly 1, such that bypass valve 23 is capable of directing the fluid from one side of the disk 54 to the opposite side when the disk is in the closed position. This makes it a simple matter for a maintenance person to open the main or shut-off valve for maintenance purposes, when desired, because the forces will then be equal on both sides of the disk.

Figure 2:
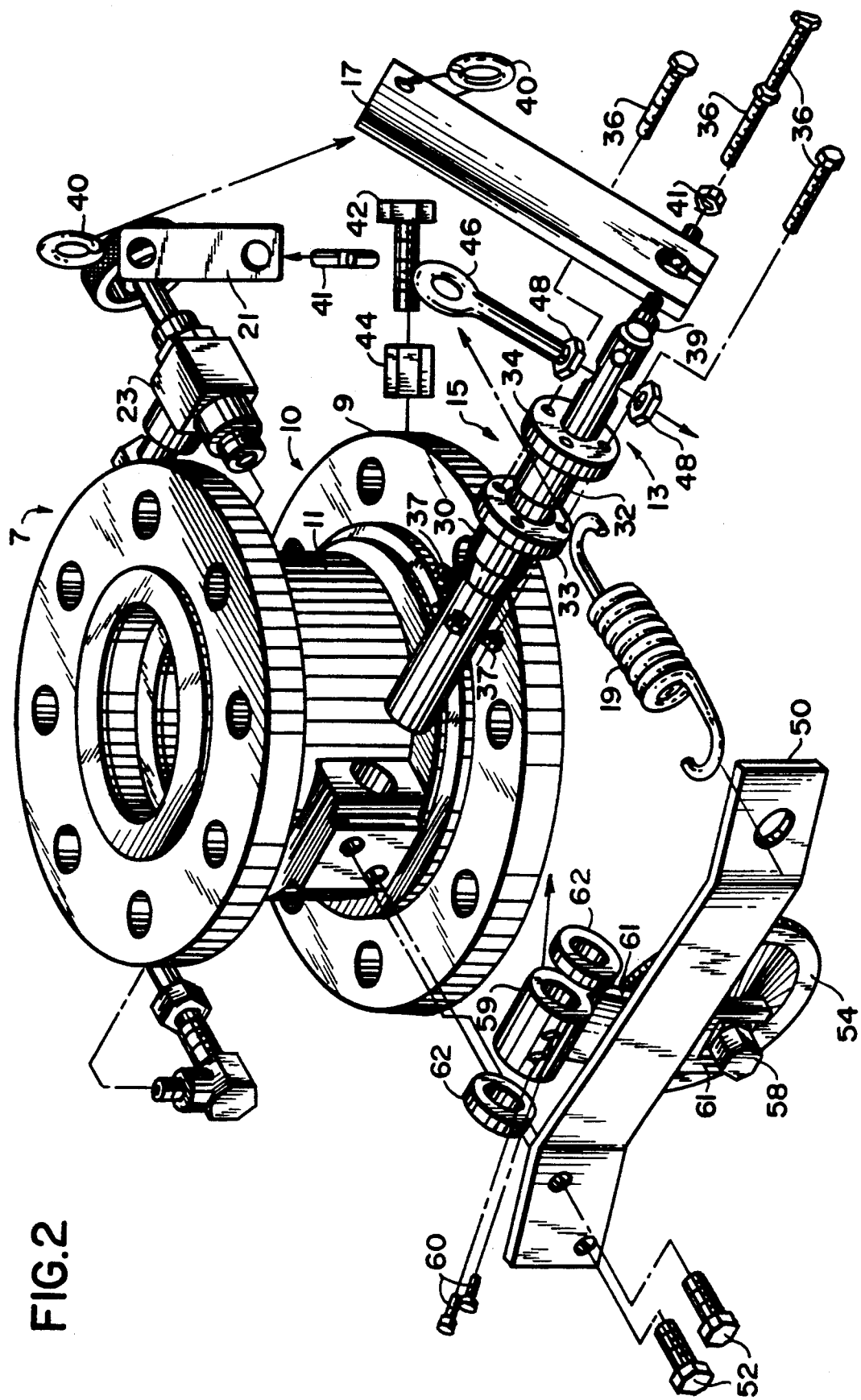
FIG. 2 is an exploded top-front perspective view of the shutoff valve assembly according to the present invention.

As shown particularly in FIG. 2, packing gland 15 includes a packing tube 30 affixed to the valve body and concentrically disposed about disc shaft 13; a packing material 32 (e.g., a non-asbestos fire rated packing) disposed between the interior surface of packing tube 30 and the exterior surface of disc shaft 13; a packing ring 34 concentrically disposed about the outer end of disc shaft 13 in such a manner that packing material 32 is securely disposed between packing tube 30 and packing ring 34; and mechanical means, e.g., bolts 36 and nuts 37, for securely affixing packing ring 34 to packing tube 30. In order to accomplish the above objectives the present inventor has developed a unique packing gland 15 wherein packing tube 30 includes a flange at its end disposed opposite of packing ring 34, whereby mechanical means 36 and 37 are disposed through packing ring 34 and the flanged end 33 of packing tube 30.

Lever 17 is affixed to disc shaft 13 by any conventional means such as bolt 38, and/or cross-bolt 39 and nut 41. Fusible link 21 is attached to lever 17 by means of at least one o-ring 40 and attached to second flanged section 9 by means of S-shaped hook 41, bolt 42 and spacer 44. Disc shaft 13 is connected to the positive spring actuator assembly by means of I-hook 46 and nuts 48 which traverses through disc shaft 13. Spring means 19 is connected on its one end to I-hook 46 and on the other end to a bracket 50 which in turn is mounted onto the sidewall of the valve body by means of bolts 52.

Also shown in FIG. 2 is shutoff disc 54 which is disposed within the interior of the valve body and connected to disc shaft 13 by means of a nut 58 disposed upon the surface of disc 54 and a mounting means 58. Mounting means 58 comprises a tube section 59 which is concentrically fitted about disc shaft 13 and a connecting bar 61 with nut 58. The tube section 59 is secured to disc shaft 13 by means of bolts 60 and o-rings 62.

Figure 3:
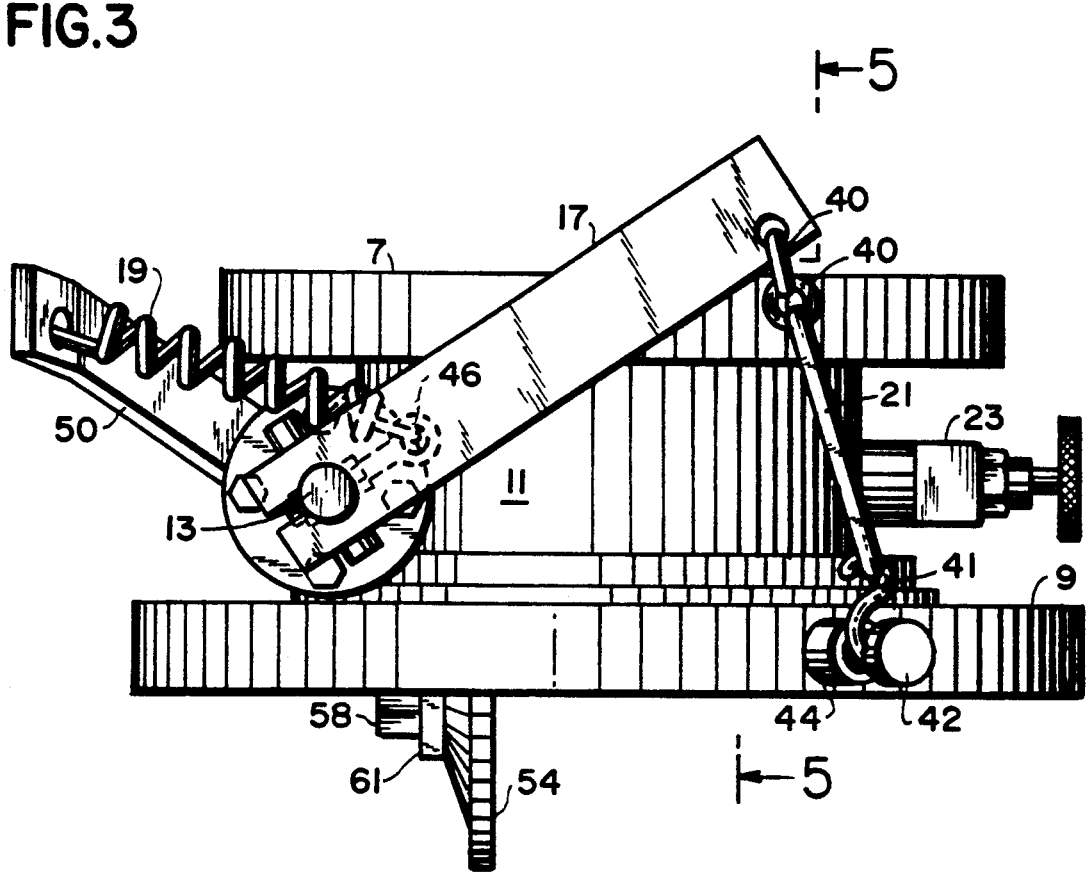
FIG. 3 is a right side elevational view of the shutoff valve assembly according to the present invention.
Figure 4:
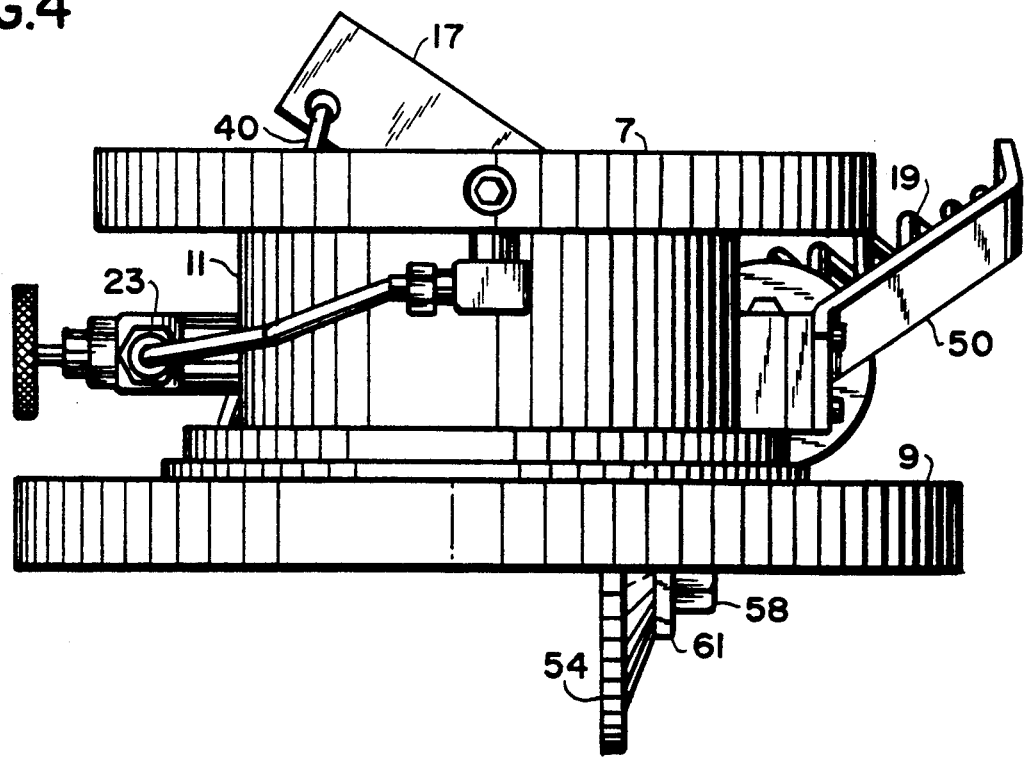
FIG. 4 is a left side elevational view of the shutoff valve assembly according to the present invention.
Figure 5:
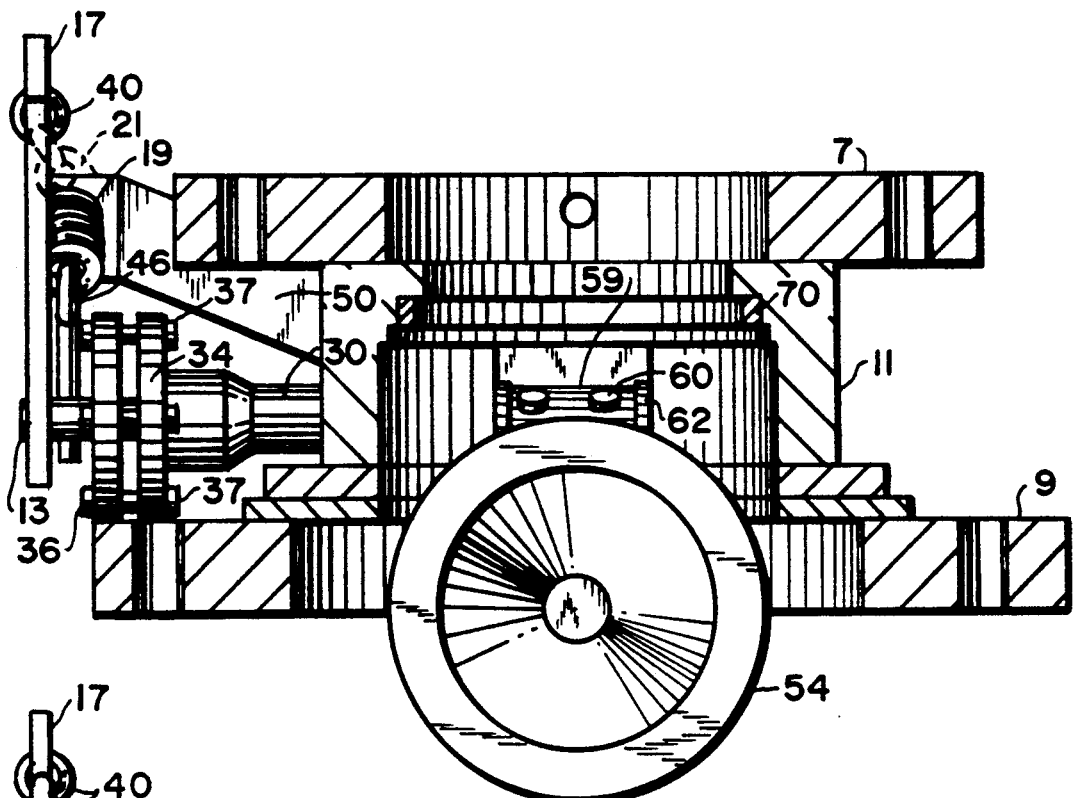
FIG. 5 is a cross-sectional view along line 5—5 of FIG. 3 with the shutoff disc in the open position.

FIGS. 3, 4 and 5 show the shutoff valve assembly while disc 54 is in the open position due to lever 17 being fully restrained by means of fusible link 21 connected to bolt 42.

Figure 6:
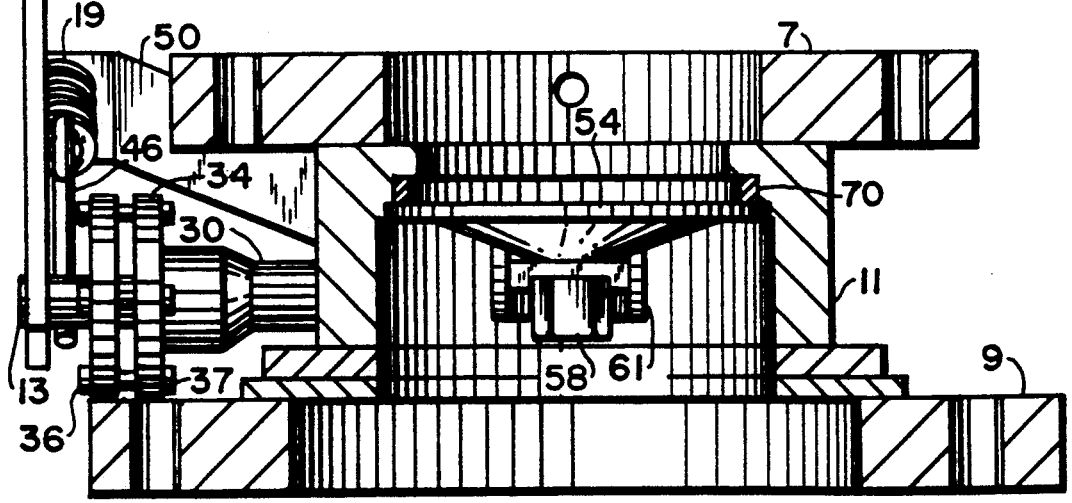
FIG. 6 is a cross-sectional view along line 6—6 of FIG. 7 with the shutoff disc in the closed position.
Figure 7:
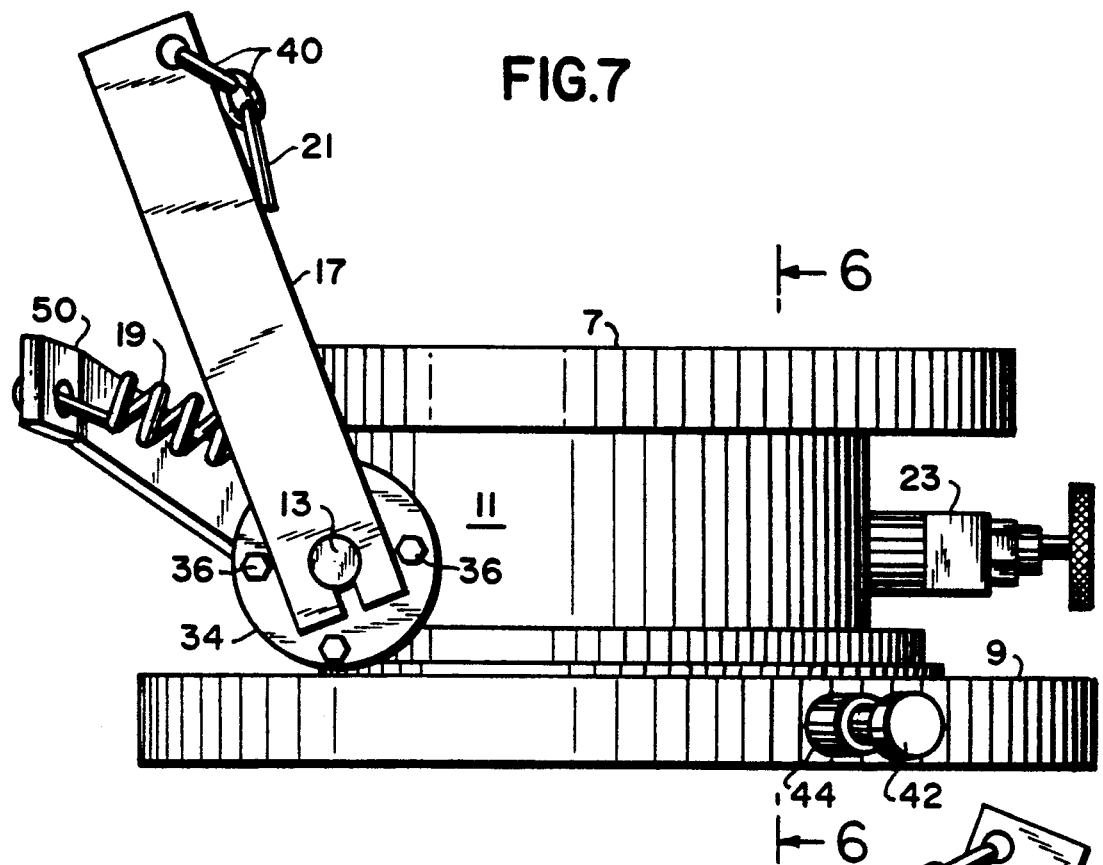
FIG. 7 is a right side elevational view of the shutoff valve assembly according to the present invention.
Figure 8:
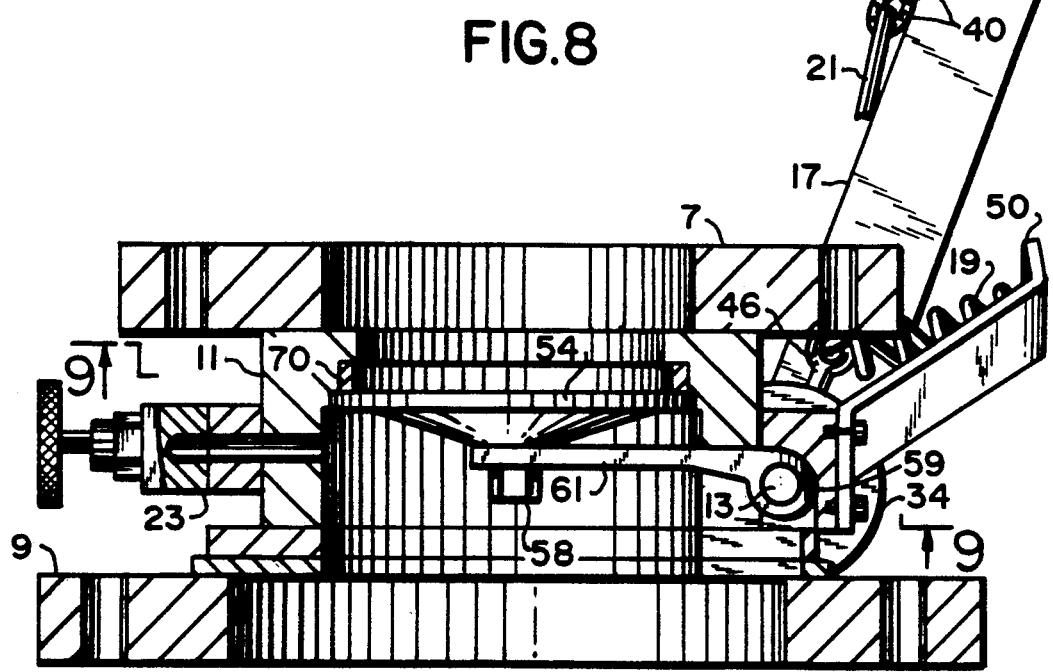
FIG. 8 is a cross-sectional view along line 8—8 of FIG. 7.

FIGS. 6, 7 and 8 all demonstrate the shutoff valve assembly while disc 54 is in the closed position, i.e., when fusible link 21 is either severed due to increased external temperatures or mechanically released. In particular, shutoff disc 54 is sealingly disposed against disc seat 70. Disc seat 70 preferably includes an integral viton o-ring. Each of the shutoff disc, disc seat and disc shaft are formed of stainless steel.

Figure 9:
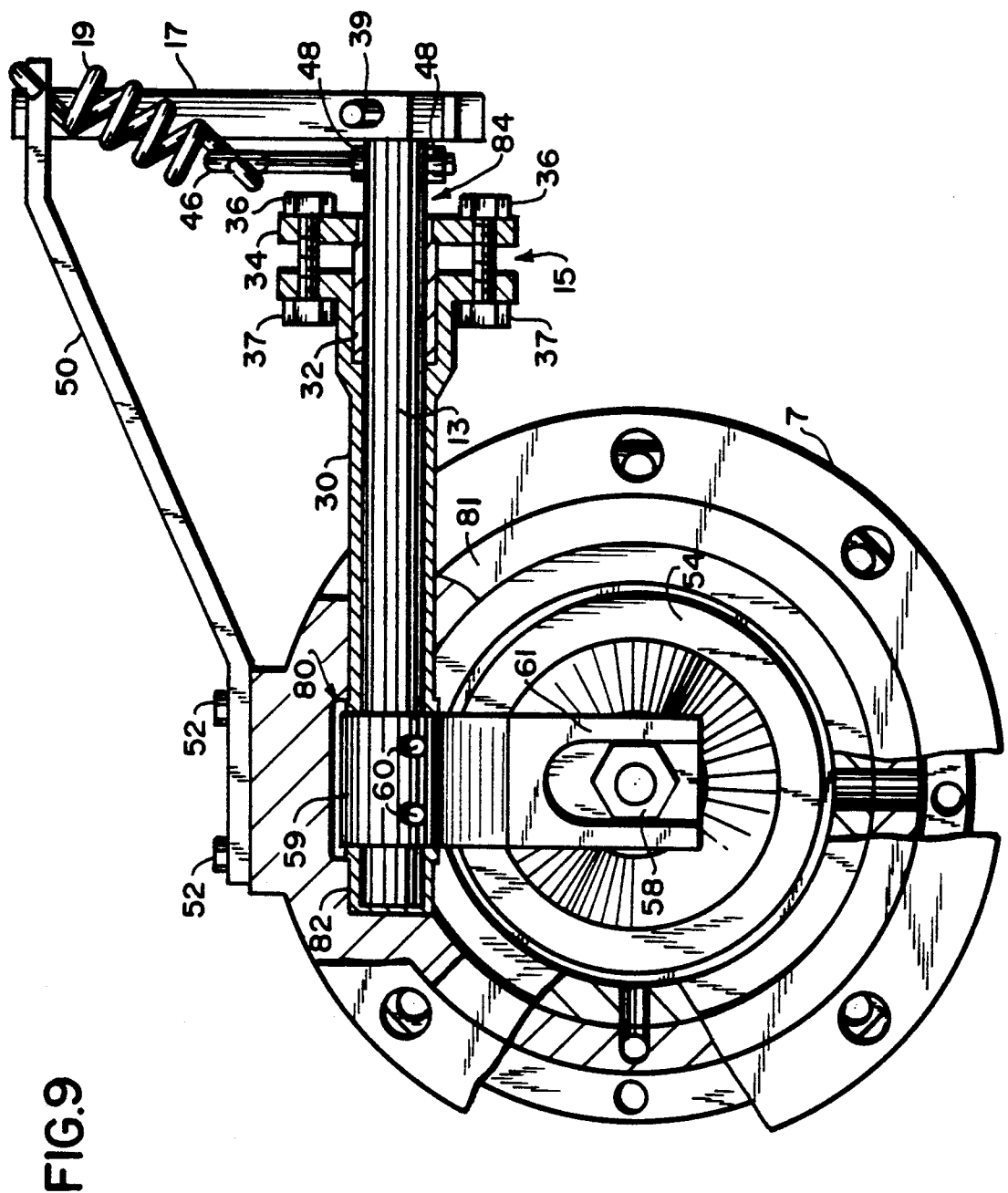
FIG. 9 is a cross-sectional view along line 9—9 of FIG. 8.
Figure 10:
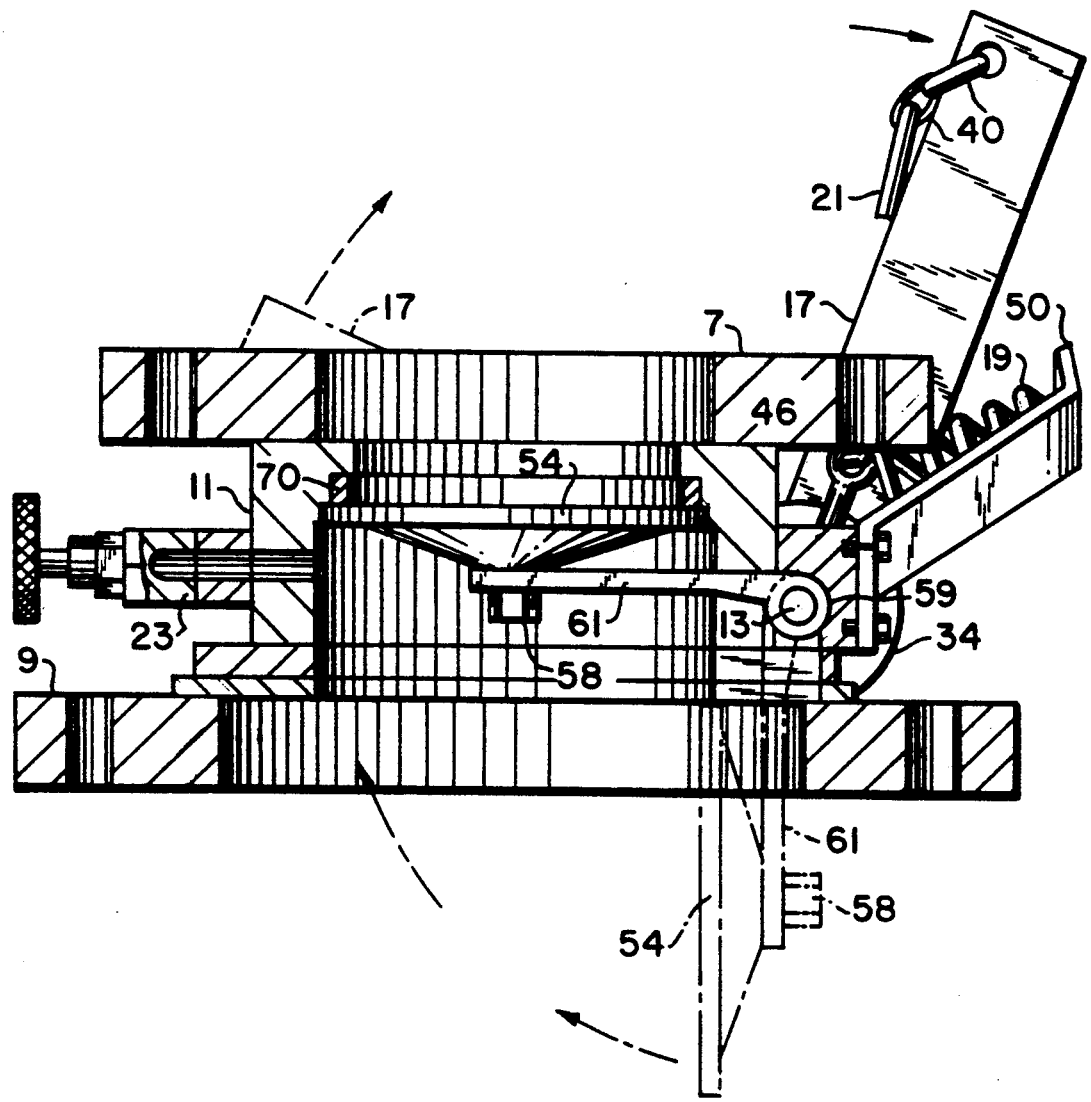
FIG. 10 is a left side elevational view of the shutoff valve assembly with the shutoff disc in the closed and opened (dashed lines) position.

FIG. 9 depicts disc 54 in an open position during normal operations. As such, disc shaft 13 is perpendicularly disposed within a sidewall of the valve body and mechanically affixed to shutoff disc 54 at a recessed portion 80 disposed within the inner surface of the valve body such that disc 54 does not restrict fluid flow, provide turbulence or cause a pressure drop while in the open position. Disc shaft 13 includes an inner end 82 disposed within the valve body and an outer end 84 disposed external of the valve body, such that inner end 82 is a terminal end and outer end 84 is an open end. Outer end 84 is preferably sealed by means of the packing gland 15 which prevents leakage of fluid from the shutoff valve. Preferably, recessed portion 80 has a depth dimension from the interior surface of main flow chamber 11 of about $\frac{1}{4}$ inch, and a width dimension of about $1\frac{1}{2}$ inches, an amount sufficient to insure that mounting means 58, including tube section 59 and connecting bar 61, is completely received by the recessed portion 80. Accordingly, disc 54, when turned by operation of shaft 13, will be completely out of the way, and thus unable to restrict fluid flow through the shutoff valve.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A shut off valve assembly which comprises:
    a substantially cylindrical formed valve body comprising a first flanged section, a second flanged section and a cylindrical main flow chamber, said first and second flanged sections being disposed on opposite sides of said cylindrical main flow chamber and having upper and lower openings defined at opposite ends of said valve body by said respective flanges
    a disc seat disposed within said valve body having an outer diameter which is greater than the internal diameter of said main flow chamber;

said valve assembly including a shut off disc, having a diameter substantially the same as the outer diameter of said disc seat, disposed within said valve body opposite said disc seat;

a step portion disposed within said valve body between said disc seat and said second flanged section;

a disc shaft perpendicularly disposed within a sidewall of said valve body and mechanically affixed to said shut off disc at a recessed portion of the inner surface of said valve body, said recessed portion being disposed within said step portion wherein said step portion has a diameter sufficiently large enough to allow said disc to be withdrawn from the path of the fluid flowing through said valve body such that said disc does not restrict fluid flow, provide turbulence or cause a pressure drop while in the open position, said disc shaft having an inner portion terminally disposed within said valve body and an outer portion disposed externally of said valve body, said outer portion being sealed near its end point by means of a packing gland which prevents leakage of fluid from said shut off valve and permits said disc shaft to rotate therewithin, said packing gland comprising: a packing tube affixed to said valve body and concentrically disposed about said disc shaft, a packing material disposed between the interior surface of said packing tube and the exterior surface of said disc shaft; a packing ring concentrically disposed about the outer end of said disc shaft in such a manner that said material is securely disposed between said packing tube and said packing ring, and mechanical means for securely affixing said packing ring to said packing tube, wherein said disc shaft is in approximately a common horizontal plane with the lowermost portion of said shut off disc, said plane being parallel to the upper and lower openings of said valve body; and a positive spring actuator assembly comprising a lever means attached to said outer portion of said disc shaft, a spring means connected to said lever means which is capable of rotating said disc shaft about its axis, and a fail safe fusible link connected to said lever means in such a manner that said disc is in an open position during normal operations and closed when the fusible link is severed due to increased external temperatures or mechanically released.

2. The shutoff valve assembly according to claim 1, further comprising an external bypass valve capable of directing the fluid flow from one side of said disc to the opposite side when said disc is in the closed position.

3. The shutoff valve assembly according to claim 1, wherein said packing material is formed of a non-asbestos fire rated packing.

4. The shutoff valve assembly according to claim 1, wherein said recessed portion extends from the interior surface of said main flow chamber about ¼ inch and 1½ inches wide.

5. The shutoff valve assembly according to claim 1, wherein said packing tube includes a flange at its end disposed opposite of said packing ring, whereby said mechanical means are disposed through said packing ring and said flanged end of said packing tube.

6. The shutoff valve assembly according to claim 1, wherein said shutoff disc, disc seat and disc shaft are formed of stainless steel.

7. The shutoff valve assembly according to claim 1, wherein said disc seat includes an integral viton o-ring.

* * * * *